US012638736B2

(12) United States Patent
　　Oikawa

(10) Patent No.:　US 12,638,736 B2
(45) Date of Patent:　　May 26, 2026

(54) ELECTROOPTIC APPARATUS AND ELECTRONIC EQUIPMENT

(71) Applicant: SEIKO EPSON CORPORATION, Tokyo (JP)

(72) Inventor: Hiroyuki Oikawa, Chitose (JP)

(73) Assignee: SEIKO EPSON CORPORATION, Tokyo (JP)

( * ) Notice: Subject to any disclaimer, the term of this patent is extended or adjusted under 35 U.S.C. 154(b) by 81 days.

(21) Appl. No.: 18/433,364

(22) Filed: Feb. 5, 2024

(65) Prior Publication Data

US 2024/0264503 A1　　Aug. 8, 2024

(30) Foreign Application Priority Data

Feb. 8, 2023　(JP) ................................. 2023-017400

(51) Int. Cl.
　　*G02F 1/1368*　　　　(2006.01)
　　*G02F 1/1335*　　　　(2006.01)
　　*G02F 1/1362*　　　　(2006.01)
(52) U.S. Cl.
　　CPC ...... *G02F 1/1368* (2013.01); *G02F 1/133526* (2013.01); *G02F 1/136227* (2013.01)
(58) Field of Classification Search
　　CPC ............. G02F 1/1368; G02F 1/133526; G02F 1/136227
　　See application file for complete search history.

(56) References Cited

U.S. PATENT DOCUMENTS

| | | | |
|---|---|---|---|
| 10,942,388 B1 * | 3/2021 | Haruyama | ........ G02F 1/133512 |
| 2015/0340386 A1 * | 11/2015 | Kawata | .................. H10D 86/60 |
| | | | 257/71 |
| 2018/0335658 A1 * | 11/2018 | Fujikawa | .......... G02F 1/136286 |
| 2018/0372950 A1 * | 12/2018 | Usami | ..................... G02B 6/12 |
| 2019/0064584 A1 | 2/2019 | Ito | |
| 2021/0157194 A1 | 5/2021 | Ito | |
| 2021/0389634 A1 * | 12/2021 | Ito | ..................... G02F 1/136209 |
| 2022/0163856 A1 * | 5/2022 | Izawa | ............... G02F 1/136227 |
| 2024/0085749 A1 * | 3/2024 | Yoshii | ............... G02F 1/136227 |

FOREIGN PATENT DOCUMENTS

| | | |
|---|---|---|
| JP | 2019040153 | 3/2019 |
| JP | 2019139252 | 8/2019 |
| JP | 2021085901 | 6/2021 |
| JP | 2021167884 | 10/2021 |

* cited by examiner

*Primary Examiner* — David Y Chung
(74) *Attorney, Agent, or Firm* — JCIPRNET

(57)　　　　　ABSTRACT

An electrooptic apparatus includes a transistor, a pixel electrode provided corresponding to the transistor, a first insulating member provided with a lens layer between the transistor and the pixel electrode, the first insulating member including a first recess and a first contact hole at a bottom portion of the first recess, and a contact plug provided in the first recess and the first contact hole, and configured to electrically connect the transistor and the pixel electrode.

10 Claims, 15 Drawing Sheets

100,A1

ELECTROOPTIC APPARATUS AND ELECTRONIC EQUIPMENT

The present application is based on, and claims priority from JP Application Serial Number 2023-017400, filed Feb. 8, 2023, the disclosure of which is hereby incorporated by reference herein in its entirety.

BACKGROUND

1. Technical Field

The present disclosure relates to an electrooptic apparatus and an electronic equipment including the electrooptic apparatus.

2. Related Art

JP-A-2021-167884 discloses an electrooptic apparatus including a pixel electrode provided on the substrate body of an element substrate, a transistor provided between the pixel electrode and the substrate body, a lens provided between the pixel electrode and the transistor, and a connecting member that extends through the layer provided with the lens and electrically connects the pixel electrode and the transistor.

The connecting member that extends through the layer provided with the lens and electrically connects the pixel electrode and the transistor needs to be provided in consideration of the limitation of the layout because the layer provided with the lens is thicker than other layers and the space for connecting components is limited due to miniaturization.

In view of the above-described problems, the present disclosure provides an electrooptic apparatus that can satisfy the limitation of the layout and favorably electrically connect between the pixel electrode and the switching element through the layer provided with the lens.

SUMMARY

An electrooptic apparatus according to an aspect of the subject application includes a transistor, a pixel electrode provided corresponding to the transistor, a first insulating member provided with a lens layer between the transistor and the pixel electrode, the first insulating member including a first recess and a first contact hole at a bottom portion of the first recess, and a first connecting member provided in the first recess and the first contact hole, and configured to electrically connect the transistor and the pixel electrode.

An electronic equipment according to an aspect of the subject application includes the above-described electrooptic apparatus.

DESCRIPTION OF EMBODIMENTS

Embodiments of the present disclosure are described below with reference to the accompanying drawings.

Note that in the following drawings, the dimensions of components may be scaled differently for the sake of clarity of the components.

In addition, in the following description, the X axis, the Y axis, and the Z axis orthogonal to each other are used as necessary for convenience of description. In addition, one direction along the X axis is denoted as X1 direction, and the direction opposite to the X1 direction is denoted as X2 direction. Likewise, one direction along the Y axis is denoted as Y1 direction, and the direction opposite to the Y1 direction is denoted as Y2 direction. One direction along the Z axis is denoted as Z1 direction, and the direction opposite to the Z1 direction is denoted as Z2 direction. In addition, in the following description, a view in the Z1 direction or the Z2 direction is referred to as "plan view", and a view in a direction perpendicular to a cross-section including the Z axis is referred to as "cross-sectional view".

Further, in the following description, regarding a substrate, "on a substrate" means any of a case where an element is disposed above the substrate in contact with the substrate, a case where an element is disposed above the substrate with another structure therebetween, and a case where one part of an element is disposed above the substrate in contact with the substrate while another part is disposed above the substrate with another structure therebetween, for example. In addition, the top surface of a configuration means the surface of the configuration on the Z1 direction side, e.g., "the top surface of an interlayer insulating layer" means the surface of the interlayer insulating layer on the Z1 direction side. In addition, the bottom surface of a configuration means the surface of the configuration on the Z2 direction side, e.g., "the bottom surface of a contact plug" means the surface of the contact plug on the Z2 direction side. In addition, the bottom surface of a recess means the surface of the bottom of the recess on the Z1 direction side.

1. Embodiment 1

In this embodiment, a liquid crystal apparatus of active drive type including a TFT (Thin Film Transistor) as a switching element for each pixel is described as an example of an electrooptic apparatus. This liquid crystal apparatus is used as a light modulation apparatus in a projection-type display device serving as an electronic equipment described later, for example.

1.1. Overview of Structure of Liquid Crystal Apparatus

Figure 1:
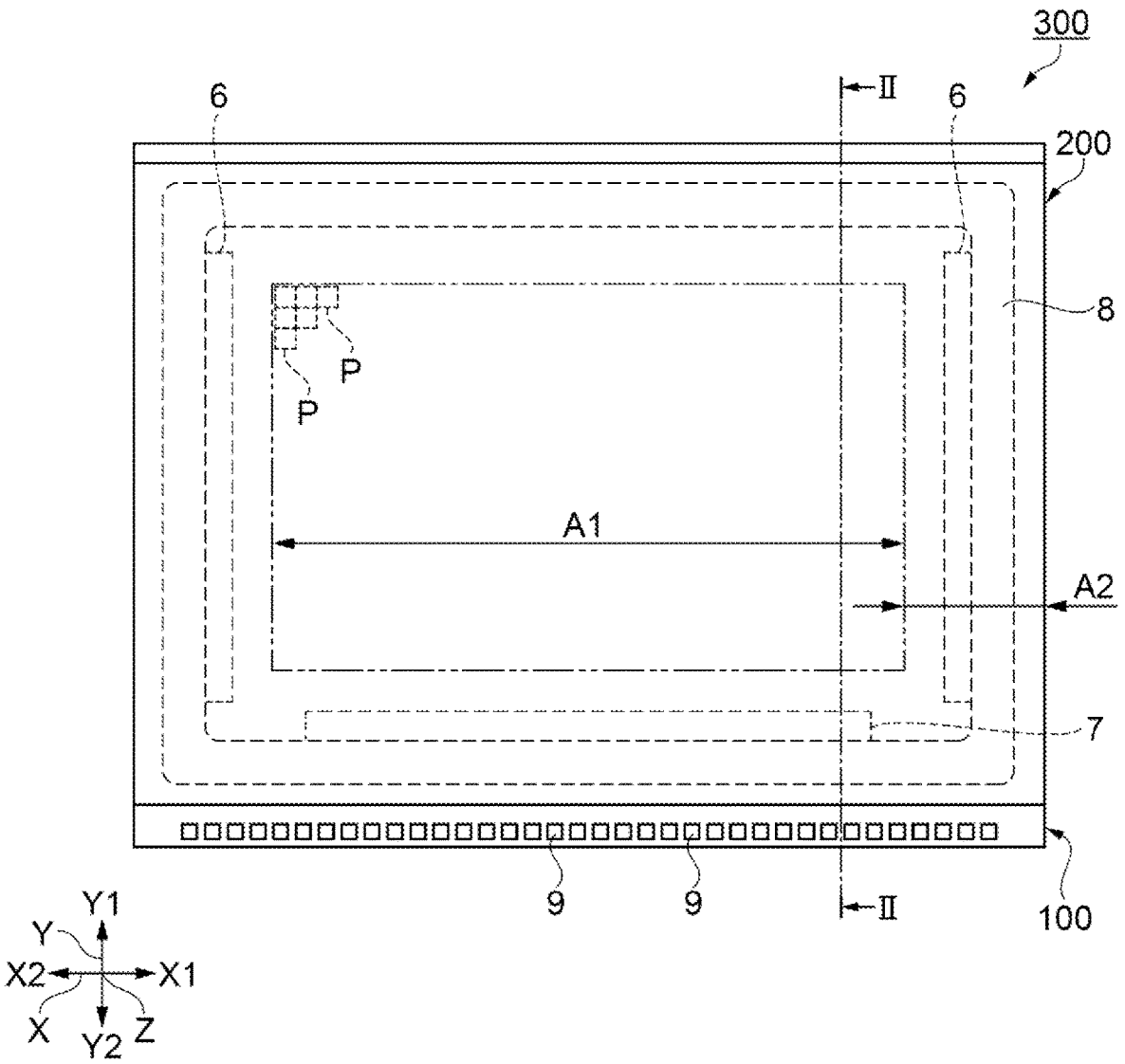
FIG. 1 is a plan view of an electrooptic apparatus according to an embodiment 1.
Figure 2:
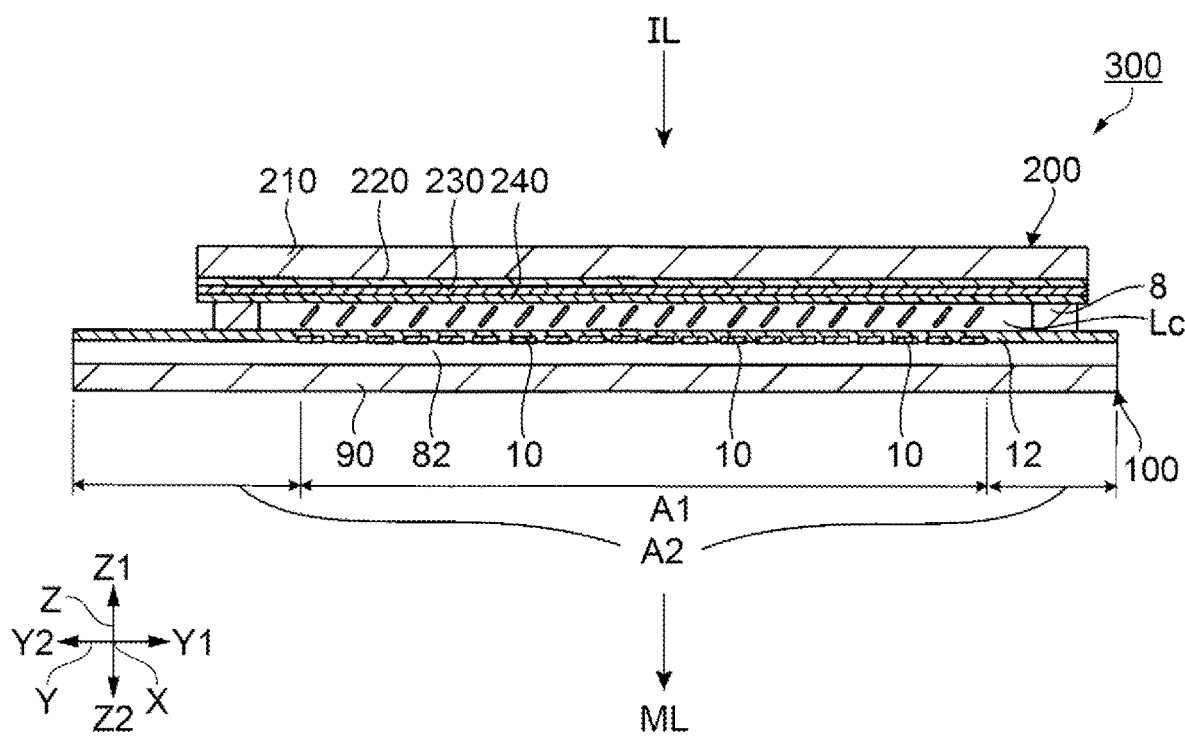
FIG. 2 is a sectional view of an electrooptic apparatus taken along a line II-II of FIG. 1.

A structure of a liquid crystal apparatus serving as an electrooptic apparatus according to this embodiment is described below with reference to FIGS. 1 and 2. FIG. 1 is a plan view of an electrooptic apparatus according to an embodiment 1, and schematically illustrates a planar configuration of a transmission type liquid crystal apparatus 300 serving as the electrooptic apparatus. FIG. 2 is a sectional view of the electrooptic apparatus taken along a line II-II of FIG. 1, and schematically illustrates a cross-sectional configuration of the liquid crystal apparatus 300.

As illustrated in FIGS. 1 and 2, the liquid crystal apparatus 300 includes an optically transparent element substrate 100, an optically transparent opposed substrate 200, a sealing member 8 provided in a frame shape, and a liquid crystal layer Lc. Note that "optically transparent" means transmissivity to visible light, and preferably means that the transmittance of visible light is 50% or greater.

The liquid crystal apparatus 300 includes a display region A1 for displaying images, and an outer region A2 located outside the display region A1 in plan view. A plurality of pixels P arranged in a matrix is provided in the display region A1. Note that while the shape of the liquid crystal apparatus 300 illustrated in FIG. 1 is a quadrangular shape, other shapes such as a circular shape may also be employed.

As illustrated in FIG. 2, the element substrate 100 and the opposed substrate 200 are disposed with the liquid crystal layer Lc interposed therebetween.

In this embodiment, the opposed substrate 200 is disposed on the light incident side of the liquid crystal layer Lc, and the element substrate 100 is disposed on the light emission side of the liquid crystal layer Lc. Incident light IL incident on the opposed substrate 200 is modulated at the liquid crystal layer Lc, and emitted from the element substrate 100 as modulated light ML.

The element substrate 100 includes a base 90, a plurality of interlayer insulating layers including an interlayer insulating layer 82, a pixel electrode 10 and an alignment film 12. In addition, although not illustrated in the drawings, a lens layer 34 described later is provided between the pixel electrode 10 and the interlayer insulating layer 82.

The base 90 is an optically transparent and insulating flat plate. The base 90 is a glass substrate or a quartz substrate, for example. A transistor 1 described later is disposed between the plurality of interlayer insulating layers.

The pixel electrode 10 is optically transparent. The pixel electrode 10 is formed of a transparent conductive material such as ITO (Indium Tin Oxide), IZO (Indium Zinc Oxide) and FTO (Fluorine-doped tin oxide), for example. The thickness direction of the pixel electrode 10 coincides with the Z1 direction or the Z2 direction.

The alignment film 12 is optically transparent and insulating. The alignment film 12 aligns the liquid crystal molecules of the liquid crystal layer Lc. Examples of the material of the alignment film 12 include silicon oxide ($SiO_2$) and polyimide.

The opposed substrate 200 is a substrate disposed opposite to the element substrate 100. The opposed substrate 200 includes a base 210, an insulating layer 220, a common electrode 230, and an alignment film 240.

The base 210 is an optically transparent and insulating flat plate. The base 210 is a glass substrate or a quartz substrate, for example.

The insulating layer 220 is optically transparent and insulating. Examples of the material of the insulating layer 220 include an inorganic material such as silicon oxide.

The common electrode 230 is an electrode disposed opposite to a plurality of the pixel electrodes 10, and may be referred to as opposite electrode. The common electrode 230 includes a transparent conductive material such as ITO, IZO and FTO, for example. The common electrode 230 and the pixel electrode 10 apply an electric field to the liquid crystal layer Lc.

The alignment film 240 is optically transparent and insulating.

The sealing member 8 is disposed between the element substrate 100 and the opposed substrate 200. The sealing member 8 is formed with an adhesive containing various curable resins such as an epoxy resin or the like. The sealing member 8 may 8 may include a gap member composed of an inorganic material such as glass.

The liquid crystal layer Lc is disposed in a region surrounded by the element substrate 100, the opposed substrate 200 and the sealing member 8. The liquid crystal layer Lc is an electrooptic layer of which the optical property changes in accordance with the electric field generated by the pixel electrode 10 and the common electrode 230. The liquid crystal layer Lc contains liquid crystal molecules with positive or negative dielectric anisotropy. The alignment of liquid crystal molecules changes in accordance with the electric field applied to the liquid crystal layer Lc. The liquid crystal layer Lc modulates the incident light IL in accordance with the applied electric field.

As illustrated in FIG. 1, a plurality of scan line driving circuits 6, a data line driving circuit 7, and a plurality of external terminals 9 are disposed in the outer region A2 of the element substrate 100. Some of the plurality the external terminals 9 are connected to the scan line driving circuit 6 or the data line driving circuit 7 through a wiring not illustrated in the drawing. In addition, the plurality the external terminals 9 include a terminal to which a common potential is applied from the outside.

1.2. Electrical Configuration of Element Substrate

Figure 3:
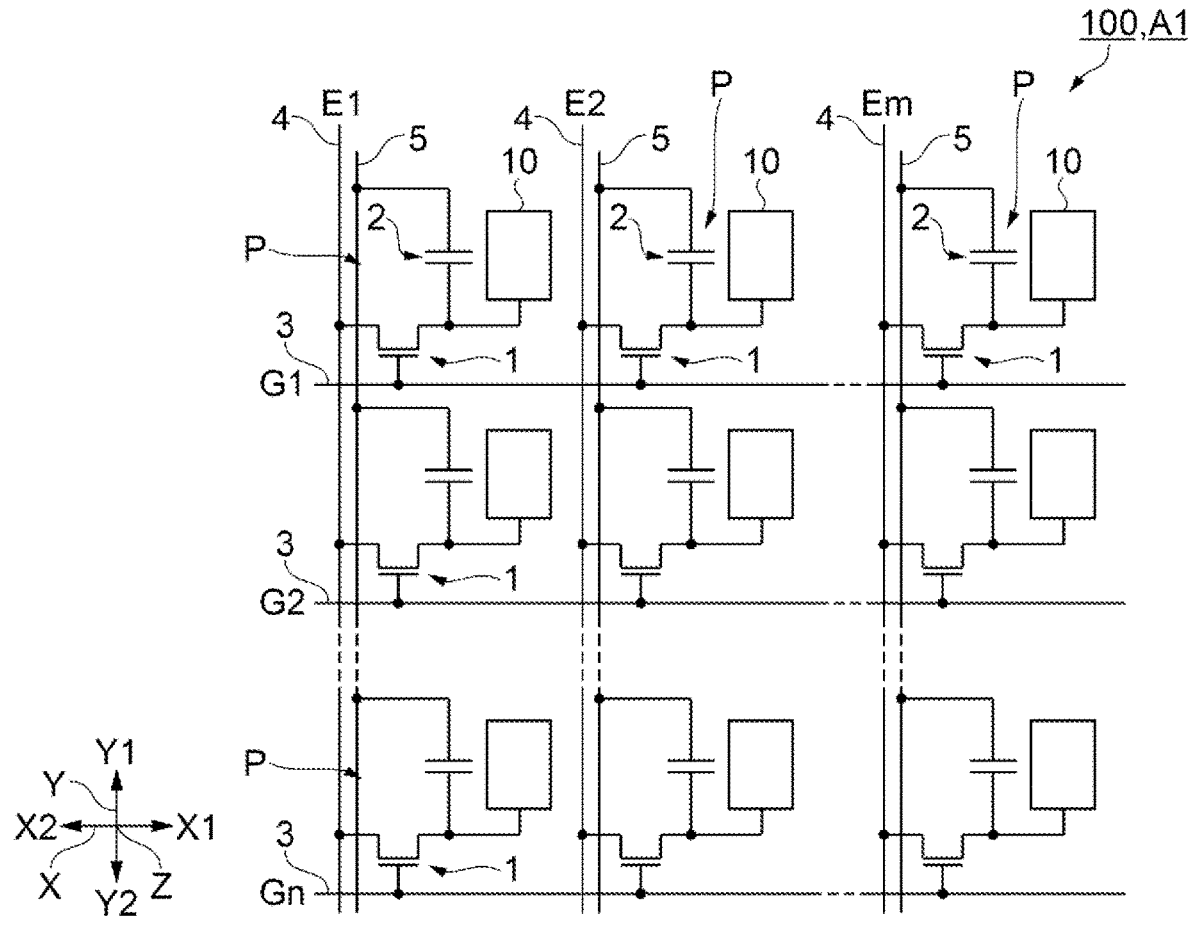
FIG. 3 is an equivalent circuit diagram illustrating an electrical configuration of an element substrate.

FIG. 3 is an equivalent circuit diagram illustrating an electrical configuration of an element substrate.

As illustrated in FIG. 3, a plurality of the transistors 1 serving as a switching element, n scan lines 3, m data lines 4, and m capacitance lines 5 are provided in the display region A1 of the element substrate 100. N and m are integers of 2 or more. The transistor 1 is disposed at a position corresponding to each intersection of the n scan lines 3 and the m data lines 4.

Each of the n scan lines 3 extends in the X1 direction, and the n scan lines 3 are disposed side by side at even intervals in the Y1 direction. Each of the n scan lines 3 is electrically connected to the gate electrode of the corresponding transistor 1. The n scan lines 3 are electrically connected to the scan line driving circuit 6 illustrated in FIG. 1.

The scan line driving circuit 6 line-sequentially supplies scanning signals G1, G2, . . . , and Gn to one to n scan lines 3.

Each of the m data lines 4 extends in the Y1 direction, and the m data lines 4 are disposed side by side at even intervals in the X1 direction. Each of the m data lines 4 is electrically connected to the source region of the plurality of corresponding transistors 1. The m data lines 4 are electrically connected to the data line driving circuit 7 illustrated in FIG. 1.

The data line driving circuit 7 supplies image signals E1, E2, . . . , and Em to one to m data lines 4.

The n scan lines 3 and the m data lines 4 are electrically isolated from each other and disposed in a grid form in plan view. The region surrounded by adjacent two scan lines 3 and adjacent two data lines 4 corresponds to the pixel P.

The pixel electrode 10 is provided for each pixel P. The pixel electrode 10 is electrically connected to the drain region of the transistor 1.

Each of the m capacitance lines 5 extends in the Y1 direction, and the m capacitance lines 5 are disposed side by side at even intervals in the X1 direction. In addition, the m capacitance lines 5 are electrically isolated from the m data lines 4 and the n scan lines 3, and are disposed with spaces between them. A fixed potential such as a ground potential or common potential is applied to each capacitance line 5.

One electrode of a capacitive element 2 is electrically connected to the capacitance line 5. The other electrode of the capacitive element 2 is electrically connected to the pixel electrode 10, and maintains the potential of the image signal supplied to the pixel electrode 10.

1.3. Cross-Sectional Structure of Display Region of Element Substrate

Figure 4:
FIG. 4 is an explanatory diagram illustrating a cross-sectional structure of a display region of the element substrate.

FIG. 4 is an explanatory diagram illustrating a cross-sectional structure of a display region of the element substrate, and illustrates a cross-sectional structure of the pixel P provided in the display region A1.

As illustrated in FIG. 4, in the display region A1, the element substrate 100 has a cross-sectional structure in which an insulating or conductive functional layer or functional film is stacked on the base 90.

A light shielding layer 80 is disposed between the base 90 and the interlayer insulating layer 82.

The light shielding layer 80 is formed of a conductive material with a light-shielding property. Note that by using a conductive material with a light-shielding property as a conductive functional layer or functional film, the conductive functional layer or functional film can function as a light shielding layer.

Examples of the conductive material with the light-shielding property include metal materials such as metals, metal nitride and metal silicide of tungsten (W), titanium (Ti), chromium (Cr), iron (Fe), aluminum (AL), and the like. The same shall apply hereinafter. Note that "light-shielding property" means the light-shielding property to visible light, and means that the transmittance of visible light is preferably less than 50%, more preferably 10% or less.

The light shielding layer 80 makes up a part of a scan line 3.

The interlayer insulating layer 82 is optically transparent and insulating. The interlayer insulating layer 82 is formed of an inorganic material such as silicon oxide ($SiO_2$), for example.

A semiconductor layer 70 is provided on the interlayer insulating layer 82.

The semiconductor layer 70 includes a drain region 70d, an LDD (Lightly Doped Drain) region 70a, a channel region 70c, an LDD region 70b and a source region 70s.

The channel region 70c is located between the source region 70s and the drain region 70d. The LDD region 70b is located between the channel region 70c and the source region 70s. The LDD region 70a is located between the channel region 70c and the drain region 70d.

The semiconductor layer 70 is, for example, polysilicon, and impurities to enhance conductivity are doped in the region except for the channel region 70c. The impurity concentration in the LDD region 70b and the LDD region 70a is lower than the impurity concentration in the source region 70s and the drain region 70d.

A gate electrode 85 is provided on the semiconductor layer 70 through a gate insulating layer 72. The gate electrode 85 overlaps the channel region 70c of the semiconductor layer 70.

The gate electrode 85 is formed by using polysilicon doped with impurities to enhance conductivity, for example. Note that the gate electrode 85 may be formed by using a conductive material such as metal, metal silicide, and metal compound.

The gate insulating layer 72 is composed of silicon oxide deposited by thermal oxidation or CVD (Chemical Vapor Deposition) method and the like, for example.

The transistor 1 includes the semiconductor layer 70, the gate electrode 85, and the gate insulating layer 72.

The gate electrode 85 and the light shielding layer 80 are electrically connected to each other via a contact hole 81, a relaying layer 83, and a contact hole 84. The contact hole 81 extends through the interlayer insulating layer 82, the gate insulating layer 72, an interlayer insulating layer 76, and an interlayer insulating layer 77. In addition, the contact hole 84 extends through the interlayer insulating layer 76 and the interlayer insulating layer 77.

The interlayer insulating layer 76 is provided on the gate electrode 85 of the transistor 1. The interlayer insulating layer 76 is formed of the same material as that of the interlayer insulating layer 82.

At the top surface of the interlayer insulating layer 76, a recess 71a and a recess 73a are provided, and a contact hole 71b extending between the bottom portion of the recess 71a, i.e., the bottom surface of the recess 71a and the drain region 70d of the semiconductor layer 70, and a contact hole 73b extending between the bottom portion of the recess 73a, i.e., the bottom surface of the recess 73a and the source region 70s of the semiconductor layer 70 are provided.

The recess 71a is provided in a region overlapping the LDD region 70a of the semiconductor layer 70 on the drain region 70d side. A contact plug 74 composed of a conductive material with a light-shielding property is provided in the recess 71a and the contact hole 71b. In this embodiment, the contact plug 74 is formed of tungsten.

The contact plug 74 is formed such that after tungsten is supplied in the recess 71a and the contact hole 71b, the tungsten is polished through CMP (Chemical Mechanical Polishing) and the like. In other words, the contact plug 74 has a damascene structure composed of the portion supplied in the recess 71a.

With this structure, a part of the contact plug 74 can be easily brought closer to the LDD region 70a. In the case where this structure is not used, a method of controlling the deposition such that the interlayer insulating layer 76 has a small thickness may be used, but this method is difficult to control, making it difficult to bring the LDD region 70a closer to a part of the contact plug 74, for example.

By bringing the LDD region 70a closer to a part of the contact plug 74, the light-shielding property of the LDD region 70a can be improved. In addition, the influence of the gate potential on the LDD region 70a can be suppressed, and thus the desired TFT characteristics can be achieved.

The recess 73a is provided in a region overlapping the LDD region 70b of the semiconductor layer 70 on the source region 70s side. A contact plug 75 composed of a conductive material with a light-shielding property is provided in the recess 73a and the contact hole 73b. In this embodiment, the contact plug 75 is formed of tungsten.

The contact plug 75 is formed by supplying tungsten in the recess 73a and the contact hole 73b, and then polishing the tungsten through CMP and the like. In other words, the contact plug 75 has a damascene structure composed of the portion supplied in the recess 73a.

With this structure, a part of the contact plug 75 can be easily brought closer to the LDD region 70b.

By bringing a part of the contact plug 75 closer to the LDD region 70b, the light-shielding property of the LDD region 70b can be improved. In addition, the influence of the gate potential on the LDD region 70b can be suppressed, and thus the desired TFT characteristics can be achieved.

The interlayer insulating layer 77 is provided on the interlayer insulating layer 76. The interlayer insulating layer 77 is formed of the same material as that of the interlayer insulating layer 82.

A relaying layer 60, a relaying layer 62, and the relaying layer 83 are provided on the interlayer insulating layer 77. The relaying layer 60, the relaying layer 62, and the relaying layer 83 are formed of a light-shielding conductive material.

The relaying layer 60 is electrically connected to the contact plug 75 via a contact hole 79 extending through the interlayer insulating layer 77.

The relaying layer 62 is electrically connected to the contact plug 74 via a contact hole 78 extending through the interlayer insulating layer 77.

An interlayer insulating layer 64 is provided on the interlayer insulating layer 77, the relaying layer 60, the relaying layer 62, and the relaying layer 83. The interlayer insulating layer 64 is formed of the same material as that of the interlayer insulating layer 82.

A relaying layer 65 and a relaying layer 67 are provided on the interlayer insulating layer 64. The relaying layer 65 and the relaying layer 67 are formed of a light-shielding conductive material.

The relaying layer 65 is electrically connected to the relaying layer 60 via a contact hole 63 extending through the interlayer insulating layer 64.

The relaying layer 67 is electrically connected to the relaying layer 62 via a contact hole 61 extending through the interlayer insulating layer 64.

An interlayer insulating layer 69 is provided on the interlayer insulating layer 64 and the relaying layer 65 and the relaying layer 67. The interlayer insulating layer 69 is formed of the same material as that of the interlayer insulating layer 82.

A conductive layer 50 and a relaying layer 52 are provided on the interlayer insulating layer 69. The conductive layer 50 and the relaying layer 52 are formed of a light-shielding conductive material.

The conductive layer 50 makes up a part of a data line 4. The conductive layer 50 is electrically connected to the relaying layer 65 via a contact hole 68 extending through the interlayer insulating layer 69.

The relaying layer 52 is electrically connected to the relaying layer 67 via a contact hole 66 extending through the interlayer insulating layer 69.

An interlayer insulating layer 54 is provided on the interlayer insulating layer 69, the conductive layer 50 and the relaying layer 52, and the capacitive element 2 is provided on the interlayer insulating layer 54.

The capacitive element 2 includes a capacitive electrode 44 provided on the base 90 side, a capacitive electrode 40 provided on the pixel electrode 10 side, and a dielectric film 45 provided between the capacitive electrode 40 and the capacitive electrode 44. The capacitive electrode 40 and the capacitive electrode 44 are formed of a light-shielding conductive material. The dielectric film 45 is formed of a desired dielectric material. The interlayer insulating layer 54 is formed of the same material as that of the interlayer insulating layer 82.

The capacitive electrode 44 makes up a part of the capacitance line 5.

The capacitive electrode 40 is electrically connected to the relaying layer 52 via a contact hole 51 extending through the interlayer insulating layer 54. In this manner, the capacitive electrode 40 is electrically connected to the drain region 70d of the transistor 1, and functions as a relaying layer for electrically connecting the transistor 1 and the pixel electrode 10. In addition, an image signal supplied to the pixel electrode 10 is supplied to the capacitive electrode 40, and a fixed potential is supplied to the capacitive electrode 44 from the capacitance line 5, and thus, the capacitive element 2 functions as a capacitor.

An optical functional layer LS including the lens layer 34 is provided between the capacitive electrode 40 and the pixel electrode 10.

The optical functional layer LS is provided for suppressing light loss. More specifically, the light path of transmitted light is adjusted to prevent transmitted light past the pixel electrode 10 from resulting in loss by hitting a functional layer formed of a conductive material with a light-shielding property such as the data line 4 and the capacitance line 5.

The optical functional layer LS includes a light transmissive layer 42, a lens formation layer 35, a light transmissive layer 22, and a protective layer 24.

The light transmissive layer 42 is a light path length adjustment layer referred to as a path layer for adjusting the light path length. The light transmissive layer 42 is formed of an inorganic material such as silicon oxide. The top surface of the light transmissive layer 42 is planarized through CMP and the like.

The lens formation layer 35 includes a light transmissive layer 32 and the lens layer 34 sequentially stacked from the base 90 side.

A concave part 32c serving as a lens surface 34s of the lens layer 34 is provided at the light transmissive layer 32. As with the light transmissive layer 42, the light transmissive layer 32 is formed of an inorganic material such as silicon oxide.

The concave part 32c of the light transmissive layer 32 is formed by depositing the light transmissive layer 32 and then etching the top surface of the light transmissive layer 32.

The lens layer 34 is provided on the light transmissive layer 32. The lens layer 34 is formed of an inorganic material with a different refractive index from that of the light transmissive layer 32, such as silicon oxynitride (SiON). The lens layer 34 is formed by depositing silicon oxynitride on the concave part 32c to fill the concave part 32c, and then planarizing it through CMP and the like.

The light transmissive layer 22 is provided on the lens layer 34. The light transmissive layer 22 is a light path length adjustment layer, and is formed of an inorganic material such as silicon oxide as with the light transmissive layer 42. The thickness of the light transmissive layer 22 is smaller than the thickness of the lens formation layer 35.

The protective layer 24 is provided on the light transmissive layer 22. The protective layer 24 is composed of an optically transparent and hygroscopic inorganic material such as BSG (Borosilicate Glass), for example.

The pixel electrode 10 is provided on the protective layer 24. The alignment film 12 is provided on the pixel electrode 10.

The pixel electrode 10 and the capacitive electrode 40 are electrically connected to each other via a pixel contact plug 21, a contact plug 31, a relaying layer 30, and a contact plug 41. In this manner, the pixel electrode 10 is electrically connected to the drain region 70d of the transistor 1 via the capacitive electrode 40.

A contact hole 23 extending through the light transmissive layer 22 and the protective layer 24 is provided between the pixel electrode 10 and the contact plug 31.

The contact hole 23 is provided for electrically connecting the pixel electrode 10 and the contact plug 31. The pixel contact plug 21 serving as a connecting member is provided in the contact hole 23. The pixel contact plug 21 is formed of a light-shielding conductive material such as tungsten.

The contact plug 31 is provided in a recess 33a and a contact hole 33b provided at the lens formation layer 35. The contact plug 31 electrically connects the pixel contact plug 21 and the relaying layer 30. The contact plug 31 is formed of a light-shielding conductive material. In this embodiment, the contact plug 31 is formed of tungsten.

At the top surface of the lens layer 34, the recess 33a is provided to partially overlap the pixel electrode 10 and the contact hole 23.

The contact hole 33b is provided so as not to overlap the pixel electrode 10 and the contact hole 23 at the bottom portion of the recess 33a, i.e., the bottom surface of the recess 33a. The contact hole 33b extends through the lens layer 34 and the light transmissive layer 32 between the bottom portion of the recess 33a and the relaying layer 30, and exposes the relaying layer 30 at the bottom of the contact hole 33b.

The contact plug 31 is formed by supplying tungsten in the recess 33a and the contact hole 33b, and then polishing the tungsten through CMP and the like, formed. In other words, the contact plug 31 has a damascene structure composed of the portion supplied in the recess 33a.

The relaying layer 30 is provided between the light transmissive layer 42 and the light transmissive layer 32. In the case where tungsten is used as the material of the contact plug 31, it is preferable that the relaying layer 30 be formed of a material with favorable conduction with tungsten, such as nitride titanium.

A contact hole 43 extending through the light transmissive layer 42 is provided between the relaying layer 30 and the capacitive electrode 40.

The contact hole 43 is provided to electrically connect the relaying layer 30 and the capacitive electrode 40, and the contact plug 41 is provided in the contact hole 43. The contact plug 41 is formed of a light-shielding conductive material such as tungsten.

1.4. Planar Structure of Display Region of Element Substrate

Figure 5:
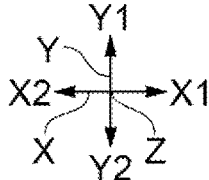
FIG. 5 is a plan view illustrating a part of the display region of the element substrate.

FIG. 5 is a plan view illustrating a part of the display region of the element substrate, and illustrates the display region A1 of the element substrate 100 as viewed from the liquid crystal layer Lc side in the Z2 direction. Note that in FIG. 5, the pixel electrode 10 is indicated by the solid line, and the configuration included in the optical functional layer LS provided on the base 90 side than the pixel electrode 10 is indicated by the broken line.

In addition, in the following plan view, the curved surface shape of the lens surface 34s is indicated by the double circle with the chain double-dashed line, and the boundary of the adjacent two lens surfaces 34s is indicated by a boundary line 34b.

As illustrated in FIG. 5, the pixel electrodes 10 are disposed along the X axis and the Y axis in a matrix. A light blocking region is provided between the pixel electrodes 10 adjacent to each other, and the center side of the pixel electrode 10 is an opening region where light is transmitted. The pixel contact plug 21, the contact plug 31, the relaying layer 30, and the capacitive electrode 40 are provided in the light blocking region. In addition, the transistor 1, the contact plug 74, the scan line 3, the data line 4, and the capacitance line 5 not illustrated in the drawing and the like are provided in the light blocking region.

The pixel contact plug 21 is provided at a position overlapping the pixel electrode 10, and in this embodiment, the pixel contact plug 21 is provided at a position overlapping the lower left corner of the four corners of the pixel electrode 10 in the drawing and overlapping a portion provided at the recess 33a in the contact plug 31. In other words, in plan view, the pixel contact plug 21 and the contact hole 23 are provided at locations not overlapping the contact hole 33b.

When the contact plug 31 is formed of tungsten, the contact plug 31 functions as an etching stopper for forming the contact hole 23, and thus the planar shape of the contact plug 31 provided at the recess 33a can be reduced. Thus, the aperture ratio is improved, and a bright pixel P can be achieved.

In this embodiment, the contact hole 33b is provided at a position not overlapping the contact hole 23 and the pixel electrode 10 in plan view. With respect to the pixel electrode 10, the contact hole 33b is provided on the side closer to a corner of the diagonally adjacent pixel electrode 10 so that the contact hole 33b, and the contact hole 23 and the pixel electrode 10 do no overlap.

In the case where the contact hole 23 is provided at a position not overlapping the contact hole 33b in the above-described manner, the deposition of the pixel electrode 10 provided on the contact hole 23 can be improved in comparison with the case where the contact hole 23 is provided at a position overlapping the contact hole 33b.

In plan view, the relaying layer 30 is provided at a position overlapping the capacitive electrode 40, the contact plug 41, the contact hole 43, the contact hole 33b, the recess 33a, the contact plug 31, the pixel contact plug 21, and the contact hole 23.

The contact plug 41 is provided at a position overlapping the contact hole 33b and the contact plug 31. In this embodiment, the contact plug 41 and the contact hole 43 substantially completely overlap the contact hole 33b in plan view.

In plan view, the capacitive electrode 40 is provided at a position overlapping the relaying layer 30, the contact plug 41, the contact hole 43, the contact plug 31, the contact hole 33b, the recess 33a, the pixel contact plug 21, and the contact hole 23.

The capacitive electrode 40 includes a wide part 40w, a protruding part 40a protruding along the Y1 direction from the wide part 40w, and a protruding part 40b protruding along the X1 direction from the wide part 40w.

In plan view, the wide part 40w has a size and a shape that overlap the entirety of the relaying layer 30.

In this embodiment, the intersection of the boundary line 34b and the contact plug 31 overlap. This means that the contact hole 33b is provided to extend through the lens layer 34.

In this embodiment, the shapes of the contact hole 23, the contact hole 33b, and the contact hole 43 are rectangular in plan view, but this is not limitative, and the shapes may be circular shapes, for example.

Figure 6:
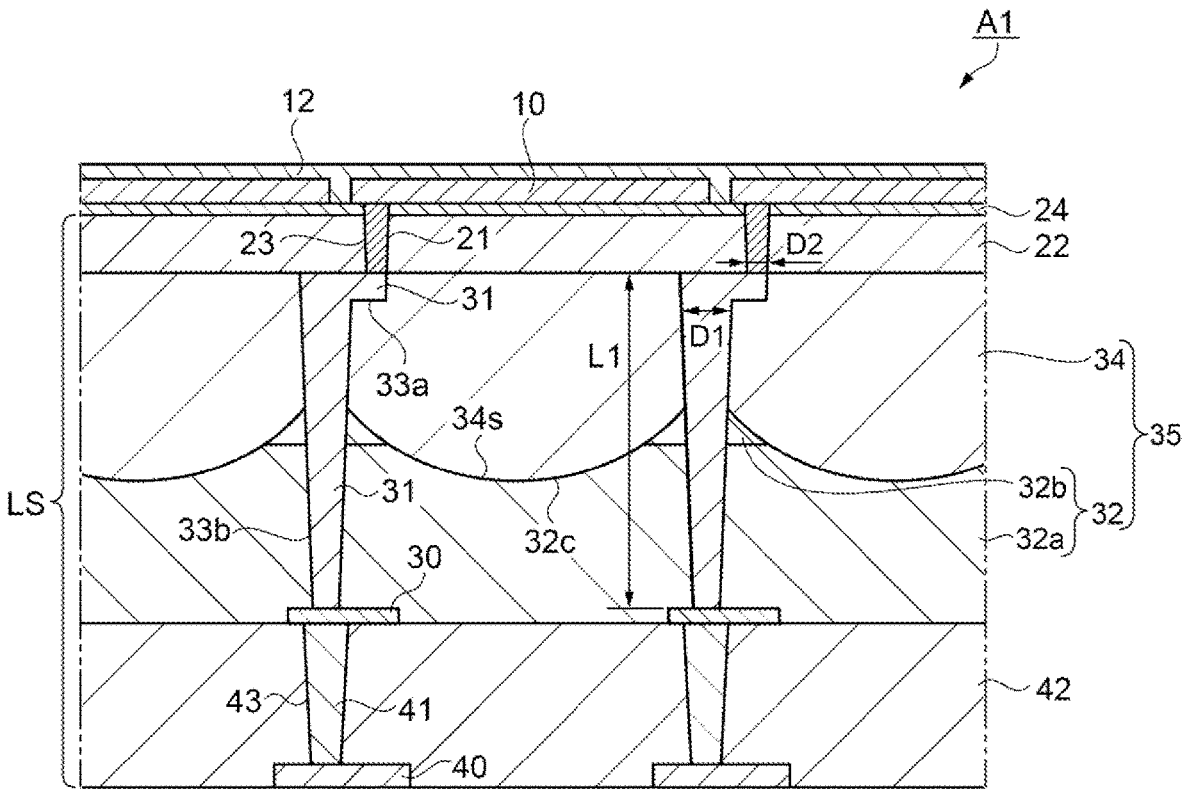
FIG. 6 is a sectional view taken along a line VI-VI of FIG. 5.
Figure 6:
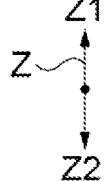
Figure 7:
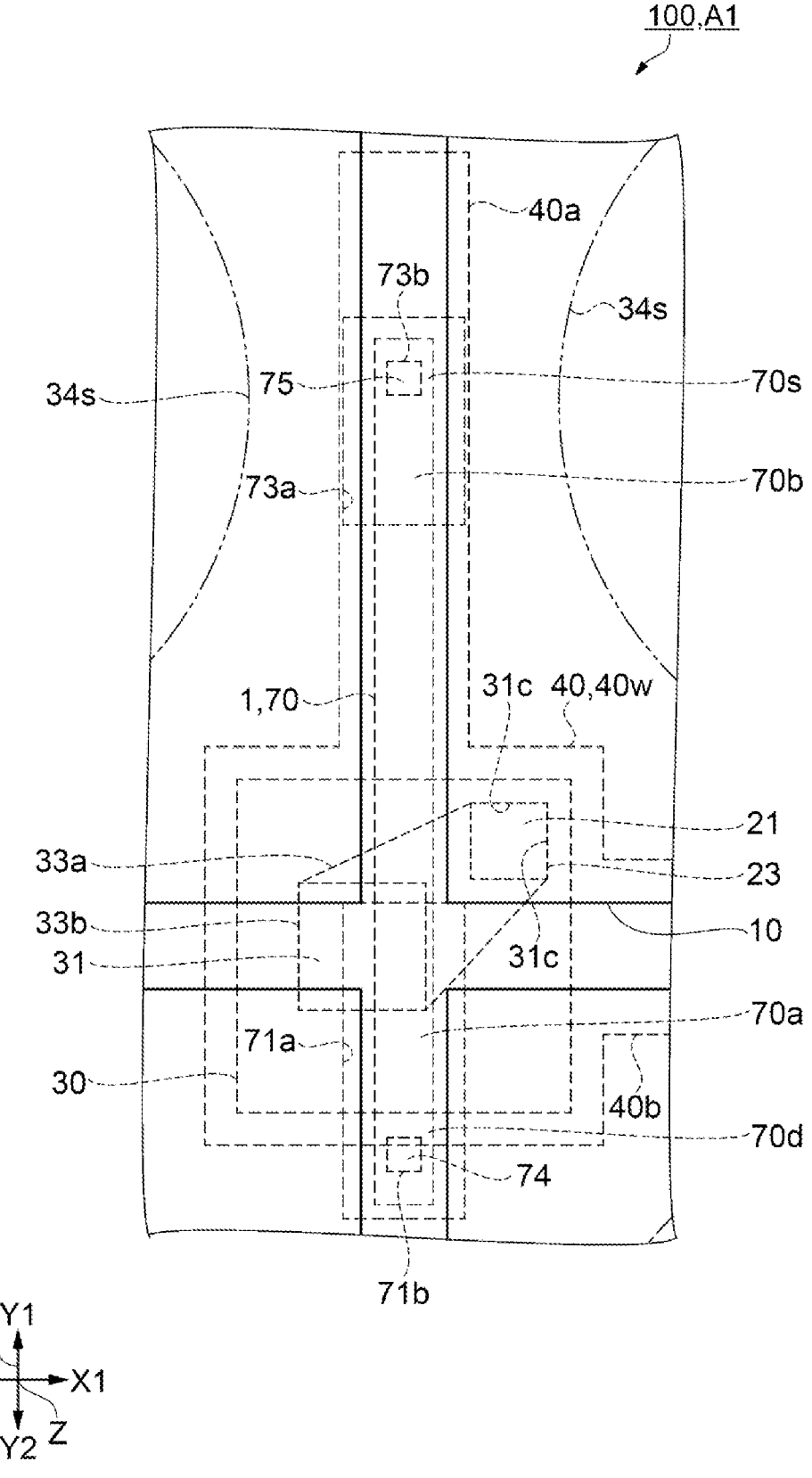
FIG. 7 is a partially enlarged plan view illustrating a part of the display region of the element substrate.

1.5. Structure of Optical Functional Layer of Display Region of Element Substrate FIG. 6 is a sectional view taken along a line VI-VI of FIG. 5, and illustrates a cross-sectional structure of the optical functional layer LS. FIG. 7 is a partially enlarged plan view illustrating a part of the display region of the element substrate.

The contact hole 23 extends through the light transmissive layer 22 and the protective layer 24, and exposes the portion provided at the recess 33a in the contact plug 31 at the bottom of the contact hole 23. The contact hole 23 has a shape of an inverted square pyramid. Thus, in the contact hole 23, the width of the opening on the pixel electrode side is greater than the width of the opening on the contact plug 31 side.

The light transmissive layer 32 includes the light transmissive layer 32a and the light transmissive layer 32b.

To provide the concave part 32c serving as the lens surface 34s of the lens layer 34, the light transmissive layer 32 is formed with a thickness of about 7 μm first. Since it is difficult as the process to form a thick bulk layer with a thickness of 7 μm in a single deposition, the light transmissive layer 32 is formed by separating it into the light transmissive layer 32a and the light transmissive layer 32b in this embodiment.

The contact hole 33b has a shape of an inverted square pyramid. Therefore, in the contact hole 33b, the width of the opening on the pixel contact plug 21 side is greater than the width of the opening on the relaying layer 30 side. Note that the shape of the contact hole 33b may be an inverted truncated conical shape.

The aspect ratio of the contact hole 33b is about twice as large as the aspect ratio of other contact holes, e.g., the contact hole 43.

In this embodiment, a depth L1 of the contact hole 33b is approximately 5 to 10 μm, and an internal diameter D1 as the width of the opening of the contact hole 33b on the pixel contact plug 21 side is approximately 1 μm. Thus, the aspect ratio L1/D1 is approximately 5 to 10.

In addition, in this embodiment, an internal diameter D2 as the width of the opening of the contact hole 23 on the contact plug 31 side is smaller than the internal diameter D1 of the contact hole 33b.

The contact hole 33b extends through the lens layer 34 and the light transmissive layer 32 from the bottom portion of the recess 33a, and exposes the relaying layer 30 at the bottom of the contact hole 33b.

The contact hole 33b is provided at a position overlapping the contact plug 41. In this manner, etching can be easily controlled. The reason for this is that the etching of the contact hole 33b results in over etching, and the bottom of the contact hole 33b is formed inside the contact plug 41 even when the contact hole 33b extends through the relaying layer 30. As a result, the contact plug 31 supplied in the contact hole 33b is brought into direct contact with the contact plug 41, and electrically connected to the contact plug 41.

FIG. 7 is a diagram illustrating arrangement positions of the semiconductor layer 70 of the transistor 1 and each configuration overlapping the semiconductor layer 70 of the transistor 1 in the display region A1 of the element substrate 100.

As illustrated in FIG. 7, the semiconductor layer 70 is disposed along the Y-axis direction in the light blocking region between the pixel electrodes 10 adjacent to each other.

The recess 73a is provided in a manner overlapping the source region 70s and the LDD region 70b of the semiconductor layer 70. At the recess 73a, the protruding part 40a of the capacitive electrode 40 provided in an overlapping manner. The contact plug 75 is provided in the recess 73a and the contact hole 73b.

The recess 71a is provided in a manner overlapping the drain region 70d and the LDD region 70a of the semiconductor layer 70. At the recess 71a, the wide part 40w of the capacitive electrode 40, the relaying layer 30, the contact plug 31, and the contact hole 33b are provided in an overlapping manner. The contact plug 74 is provided in the recess 71a and the contact hole 71b. In other words, a part of the contact plug 74 supplied in the recess 71a partially overlaps the contact plug 31 in plan view.

An end portion 31c of the contact plug 31 indicates the end on the center side of the pixel electrode 10, i.e., the opening region side in the contact plug 31. In plan view, the end portion 31c of the contact plug 31 is provided in a manner overlapping the end portion of the contact hole 23 on the opening region side. In other words, the end portion 31c of the contact plug 31 is provided in a manner overlapping the end portion of the pixel contact plug 21 on the opening region side.

In this manner, in plan view, the end portion 31c of the contact plug 31 does not protrude from the end portion of the pixel contact plug 21 to the opening region side, and thus a wide opening region can be achieved.

1.6. Modifications

Various modifications may be made for the above-described embodiment. Examples of specific modifications are described below.

Figure 8:
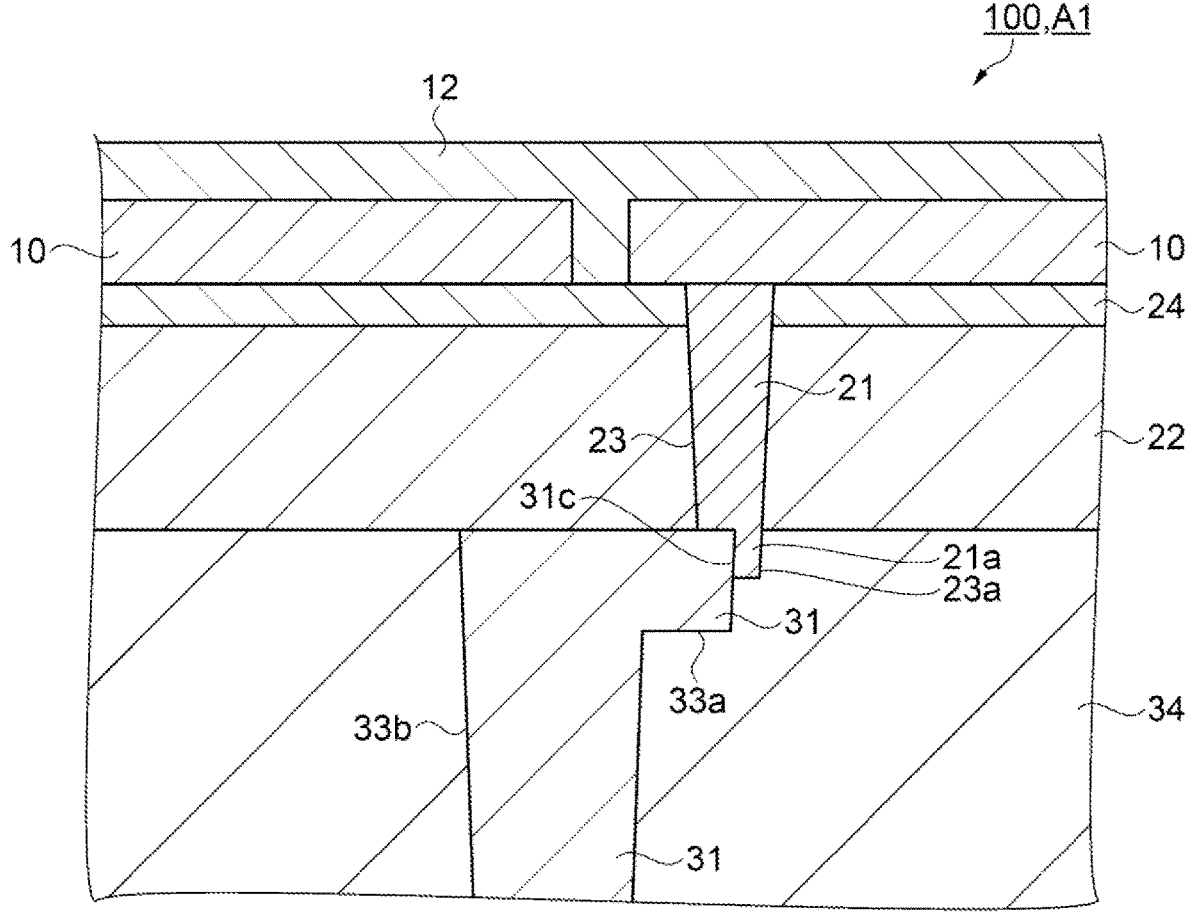
FIG. 8 is a partially enlarged sectional view illustrating a part of a display region of an element substrate according to a modification 1.
Figure 8:
Figure 9:
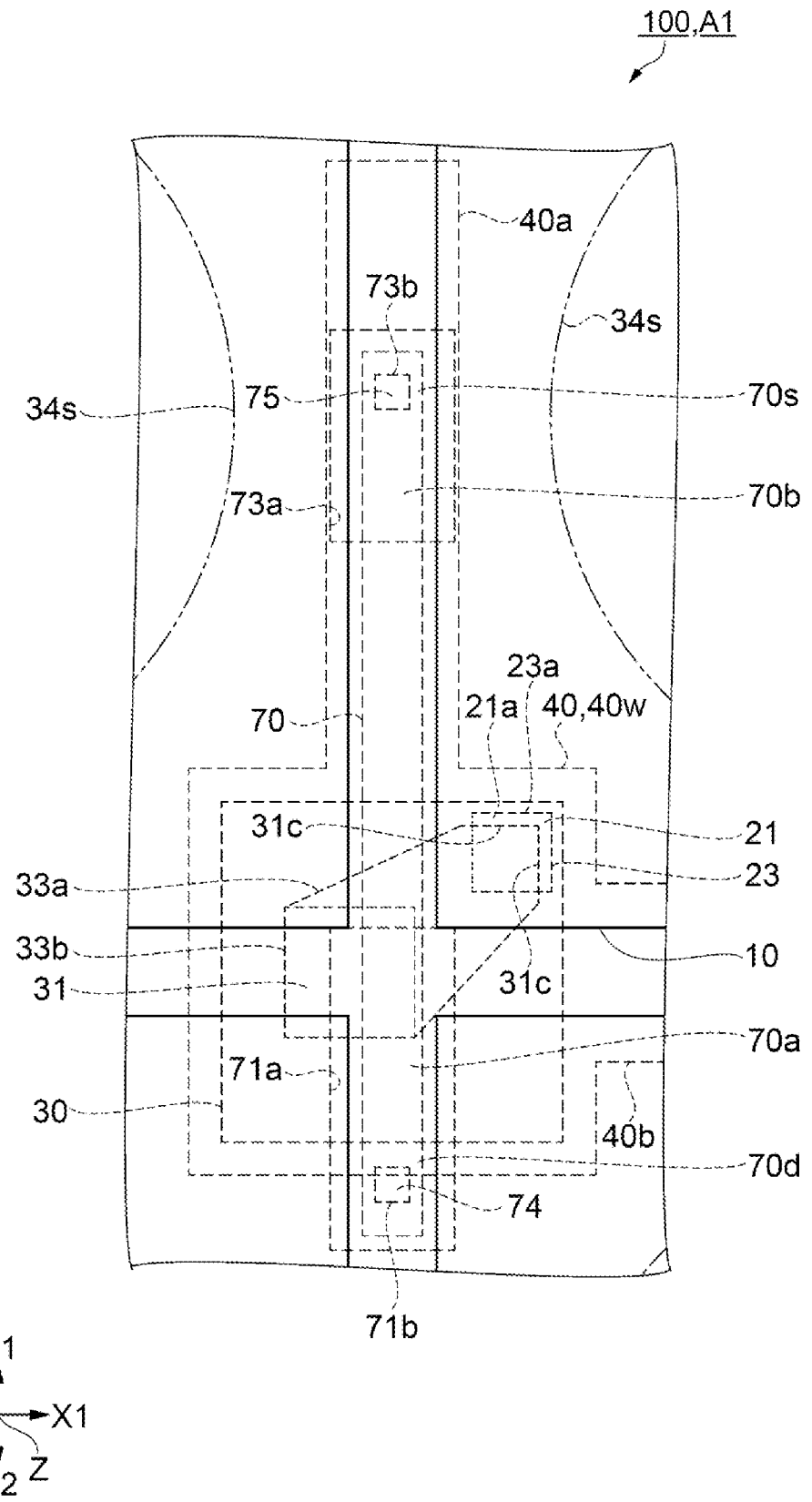
FIG. 9 is a partially enlarged plan view illustrating a part of the display region of the element substrate according to the modification 1.
Figure 10:
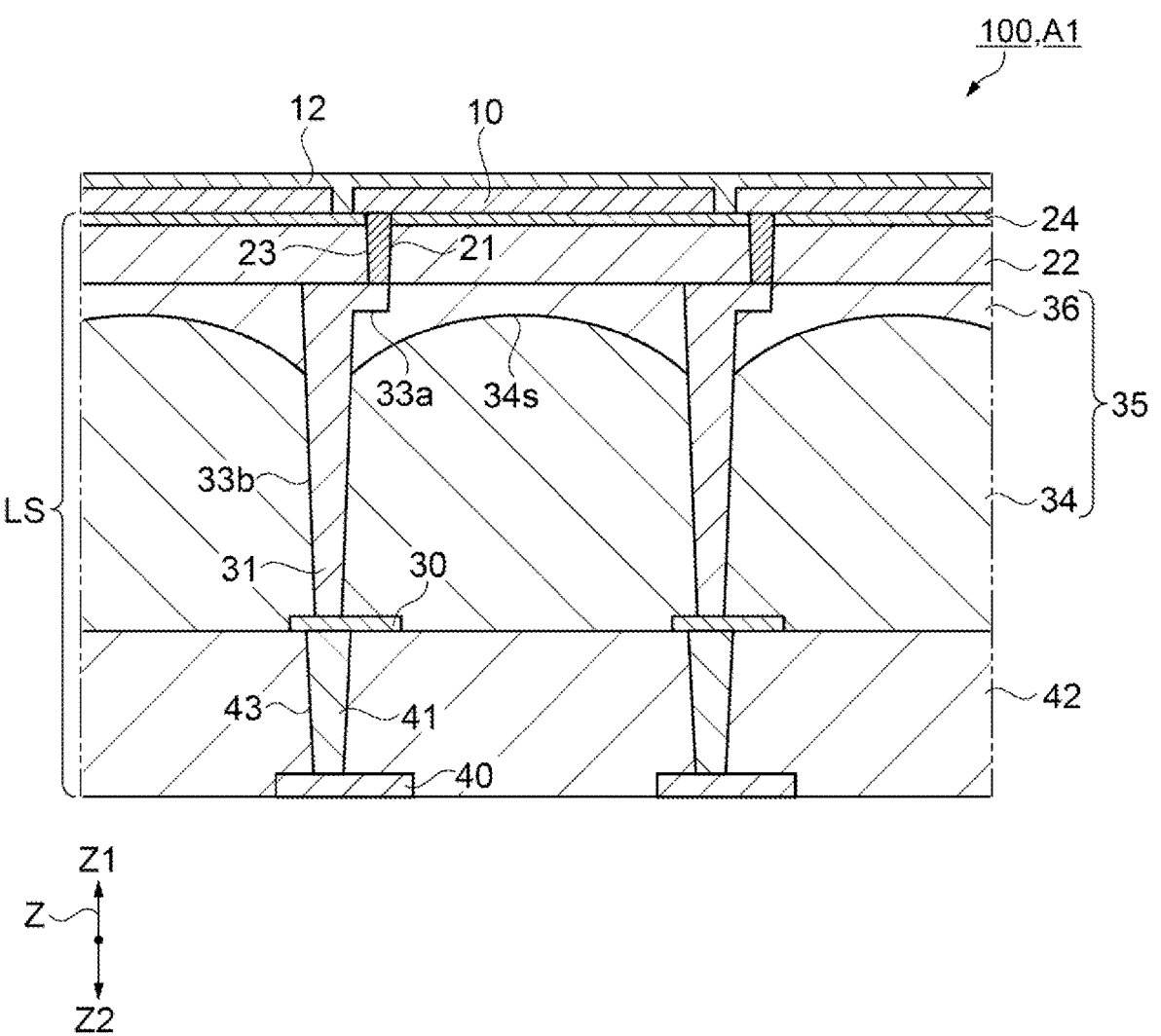
FIG. 10 is a sectional view illustrating a part of a display region of an element substrate according to a modification 2.

FIG. 8 is a partially enlarged sectional view illustrating a part of a display region of an element substrate according to a modification 1. FIG. 9 is a partially enlarged plan view illustrating a part of the display region of the element substrate according to the modification 1. FIG. 10 is a sectional view illustrating a part of a display region of an element substrate according to a modification 2. Note that in the following description, differences from the embodiment 1 are mainly described. The same components as those of the embodiment 1 are denoted with the same reference numerals, and the description thereof will be omitted.

1.6.1. Modification 1

FIG. 8 is a cross-sectional view illustrating an overlapping state of the contact hole 23 and the recess 33a in the display region A1 of the element substrate 100, and FIG. 9 is a plan view illustrating an overlapping state of the contact hole 23 and the recess 33a in the display region A1 of the element substrate 100.

As illustrated in FIGS. 8 and 9, in the element substrate 100 according to the modification 1, the pixel contact plug 21 includes a protruding part 21a as a portion protruded from the end portion 31c of the contact plug 31 provided at the recess 33a. The protruding part 21a of the pixel contact plug 21 is a portion protruded from the end portion 31c of the contact plug 31 to the center side of the pixel electrode 10, i.e., the opening region side. Note that the protruding part 21a of the pixel contact plug 21 may be referred to also as a portion stepped off from the contact plug 31.

In this manner, in the case where the pixel contact plug 21 includes the protruding part 21a, the end portion 31c of the contact plug 31 is located on the light blocking region side than an end portion 23*a* of the contact hole 23.

With the configuration of the modification 1, the end portion 31*c* of the contact plug 31 is located on the light blocking region side than the end portion 23*a* of the contact hole 23, and it is possible to suppress the reduction of the size of the opening region with the contact plug 31. Furthermore, with the protruding part 21*a* of the pixel contact plug 21 in contact with the end portion 31*c* of the contact plug 31, the electrical connecting between the pixel contact plug 21 and the contact plug 31 can be ensured.

In this embodiment, the contact plug 31 is formed of tungsten. Tungsten has a high selection ratio in the etching for forming the contact hole 23, and therefore the contact hole 23 does not penetrate the contact plug 31. In addition, while a part of the contact hole 23 steps off from the contact plug 31, the pixel contact plug 21 is electrically connected to the contact plug 31 with the protruding part 21*a* of the pixel contact plug 21 in contact with the end portion 31*c* of the contact plug 31. In this manner, it is possible to achieve a configuration that enables high aperture ratio by minimizing the overlap of the contact plug 31 and the pixel electrode 10.

1.6.2. Modification 2

FIG. 10 is a sectional view illustrating a part of a display region of an element substrate according to a modification 2.

As illustrated in FIG. 10, the element substrate 100 according to the modification 2 is different from the embodiment 1 in the configuration of the lens formation layer 35. In the modification 2, the lens formation layer 35 includes the lens layer 34 and a light transmissive layer 36 sequentially stacked from the base 90 side.

The lens layer 34 is provided on the light transmissive layer 42. The lens layer 34 includes the lens surface 34*s* protruded to the pixel electrode 10 side. The lens surface 34*s* is formed by depositing the lens layer 34, and then etching the top surface of the lens layer 34. The material of the lens layer 34 is formed of an inorganic material with a different refractive index from that of the light transmissive layer 36, e.g., silicon oxynitride. The light transmissive layer 36 is formed of silicon oxide.

1.7. Method of Forming Contact Plug

Next, a method of forming the contact plug 31 is described with reference to FIGS. 11 to 14. FIGS. 11 to 14 are sectional views illustrating implementation in a manufacturing process of the contact plug 31.

First, a photoresist 110 is applied on the lens layer 34, and then patterning is performed on the photoresist 110 by exposing and developing the photoresist 110.

Figure 11:
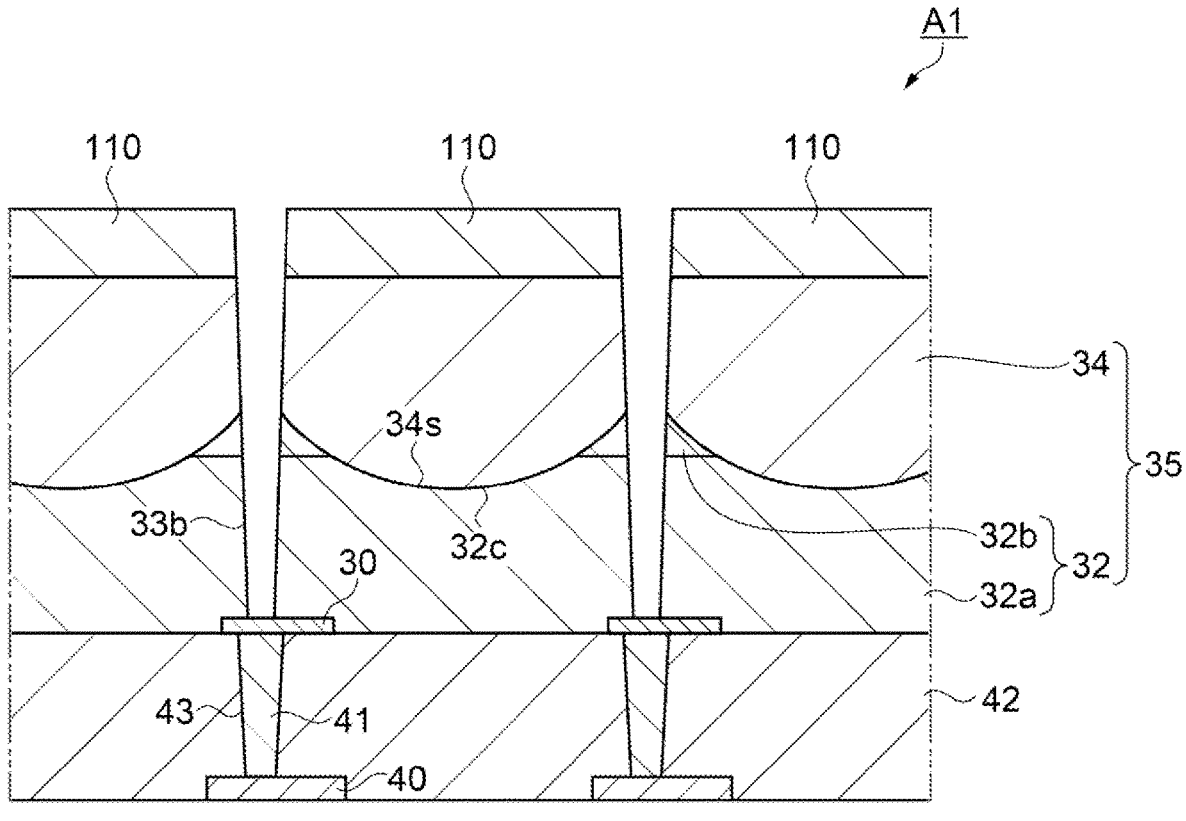
FIG. 11 is a sectional view illustrating an aspect in a manufacturing process.
Figure 11:
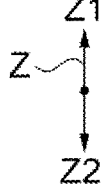

Then, as illustrated in FIG. 11, by using the patterned photoresist 110 as a mask, the contact hole 33*b* exposing the relaying layer 30 is formed by selectively etching the lens formation layer 35 including the lens layer 34 and the light transmissive layer 32.

Next, after removing the photoresist 110, and applying a photoresist 111 onto the lens layer 34 including the contact hole 33*b*, the photoresist 111 is patterned by exposing and developing the photoresist 111.

Figure 12:
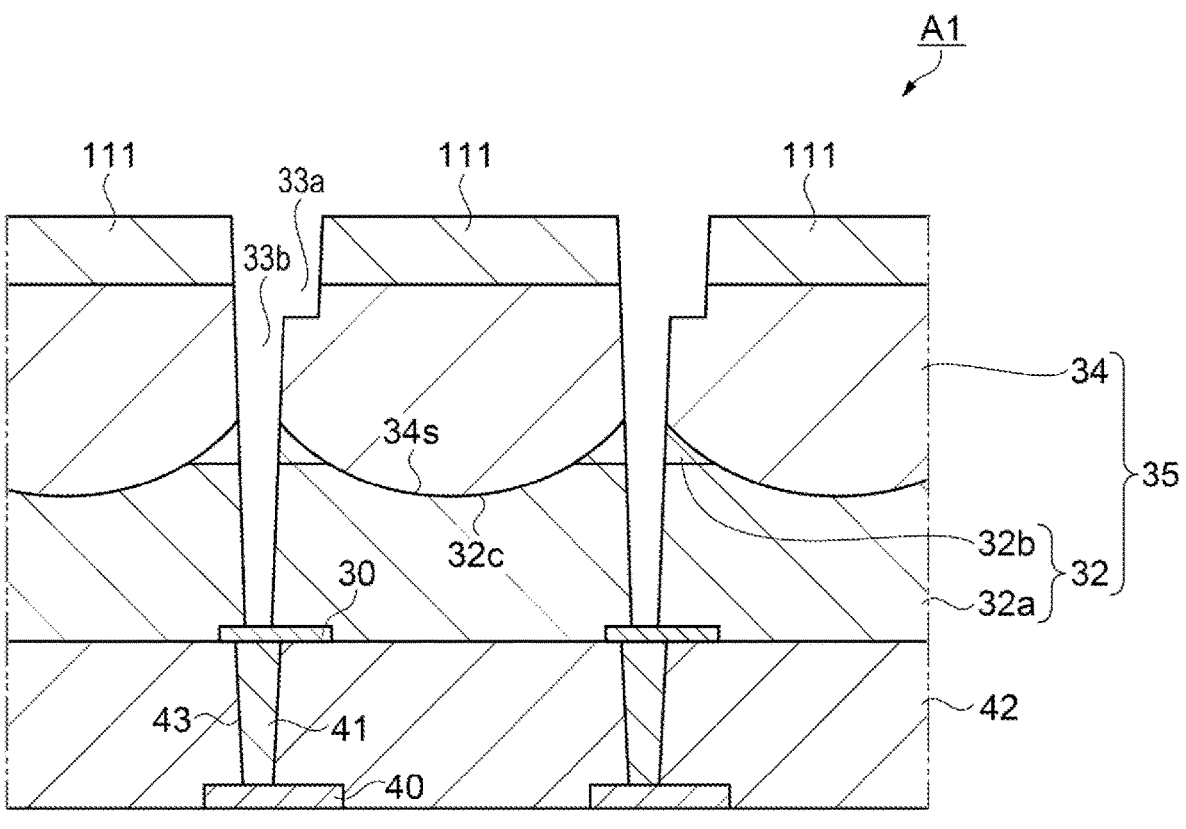
FIG. 12 is a sectional view illustrating an aspect in a manufacturing process.
Figure 12:
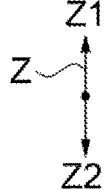

Then, as illustrated in FIG. 12, by using the patterned photoresist 111 as a mask, the recess 33*a* is formed by selectively etching the lens layer 34 by a predetermined depth. At this time, the internal diameter of the contact hole 33*b* is increased by the etching. In this manner, the recess 33*a*, and the contact hole 33*b* with an opening at the bottom portion of the recess 33*a* are formed.

Figure 13:
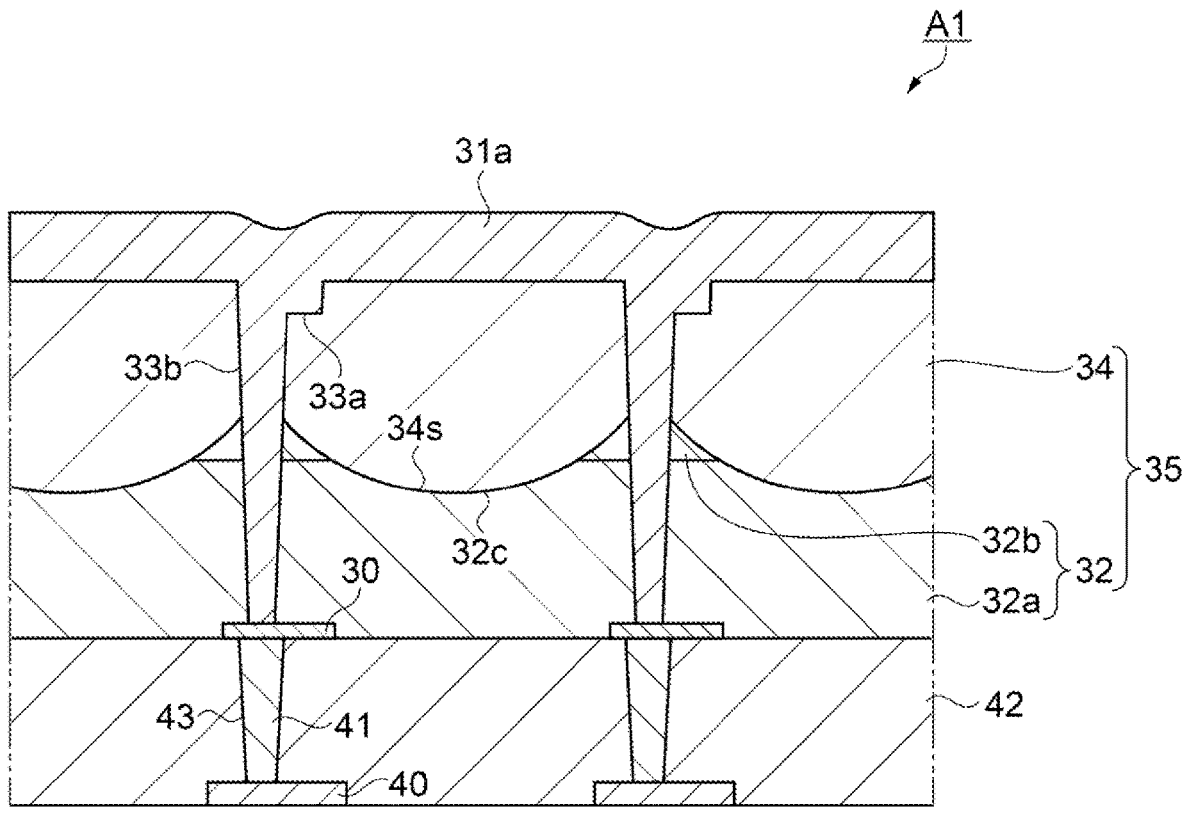
FIG. 13 is a sectional view illustrating an aspect in a manufacturing process.
Figure 13:

Next, as illustrated in FIG. 13, tungsten is supplied into the recess 33*a* and the contact hole 33*b*. The tungsten is deposited by a plasma CVD method. In this manner, a tungsten layer 31*a* is formed in the recess 33*a* and the contact hole 33*b*, and on the lens layer 34.

Figure 14:
FIG. 14 is a sectional view illustrating an aspect in a manufacturing process.
Figure 14:
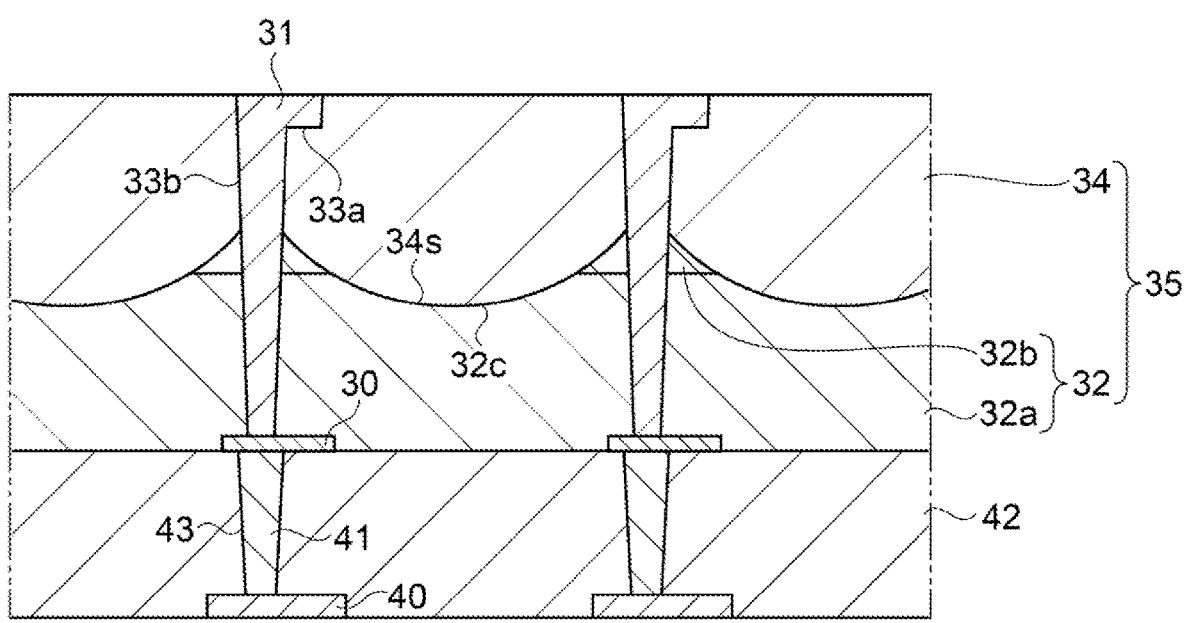
Figure 14:
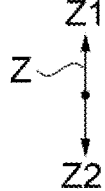

Next, as illustrated in FIG. 14, the tungsten layer 31*a* on the lens layer 34 is removed through a polishing process such as CMP, and the contact plug 31 composed of tungsten is formed in the recess 33*a* and the contact hole 33*b*.

As described above, the liquid crystal apparatus 300 as the electrooptic apparatus of this embodiment includes the transistor 1, the pixel electrode 10 provided corresponding to the transistor 1, the lens formation layer 35 as an insulating member provided with the lens layer 34 between the transistor 1 and the pixel electrode 10 and including the recess 33*a* and the contact hole 33*b* at the bottom portion of the recess 33*a*, and the contact plug 31 as a connecting member provided in the recess 33*a* and the contact hole 33*b* to electrically connect the transistor 1 and the pixel electrode 10.

In this manner, the contact plug 31 is provided in the recess 33*a* of the lens formation layer 35 and the contact hole 33*b* at the bottom portion of the recess 33*a*. In other words, the contact plug 31 has a damascene structure composed of the portion provided at the recess 33*a*.

Since the transistor 1 and the pixel electrode 10 are electrically connected by the contact plug 31 with the damascene structure, the liquid crystal apparatus 300 that can satisfy the limitation of the layout, and favorably electrically connect between the pixel electrode 10 and the transistor 1 can be provided.

The liquid crystal apparatus 300 of this embodiment further includes the light transmissive layer 22 as an insulating member including the contact hole 23 and provided between the lens formation layer 35 as an insulating member and the pixel electrode 10, and the pixel contact plug 21 as a connecting member provided in the contact hole 23 to electrically connect the contact plug 31 and the pixel electrode 10, and the contact hole 33*b* and the contact hole 23 are provided so as not to overlap each other in plan view.

In this manner, since the contact hole 33*b* and the contact hole 23 are provided so as not to overlap each other in plan view, the liquid crystal apparatus 300 that can satisfy the limitation of the layout, and favorably electrically connect between the pixel electrode 10 and the transistor 1 can be provided.

Further, in the liquid crystal apparatus 300 of this embodiment, the internal diameter D2 as the width of the opening of the contact hole 23 on the contact plug 31 side is smaller than the internal diameter D1 as the width of the opening of the contact hole 33*b* on the pixel contact plug 21 side.

In this manner, the liquid crystal apparatus 300 that can satisfy the limitation of the layout, achieve a high aperture ratio without reducing the opening region, and favorably electrically connect between the pixel electrode 10 and the transistor 1 can be provided.

Further, in the liquid crystal apparatus 300 of this embodiment, the pixel contact plug 21 includes the protruding part 21*a* as a portion protruded from the contact plug 31 in plan view.

In this manner, the liquid crystal apparatus 300 that can satisfy the limitation of the layout, increase the opening region, and favorably electrically connect between the pixel electrode 10 and the transistor 1 can be provided.

Further, in the liquid crystal apparatus 300 of this embodiment, the contact hole 33*b* is provided so as not to overlap the pixel electrode 10 in plan view.

In this manner, the liquid crystal apparatus 300 that can satisfy the limitation of the layout, achieve a high aperture ratio without reducing the opening region, and favorably electrically connect between the pixel electrode 10 and the transistor 1 can be provided.

The liquid crystal apparatus 300 of this embodiment further includes the capacitive electrode 40 as a relaying layer that electrically connects the contact plug 31 and the transistor 1, and the contact plug 31 and the pixel contact plug 21 are provided in regions overlapping the capacitive electrode 40 in plan view. In this manner, the liquid crystal apparatus 300 that can satisfy the limitation of the layout, and favorably electrically connect between the pixel electrode 10 and the transistor 1 can be provided.

Further, in the liquid crystal apparatus 300 of this embodiment, the capacitive electrode 40 includes the wide part 40w that overlaps the transistor 1 in plan view, the protruding part 40a that protrudes from the wide part 40w along the Y1 direction as a first direction, and the protruding part 40b that protrudes from the wide part 40w along the X1 direction as a second direction intersecting the Y1 direction, and the contact plug 31 and the pixel contact plug 21 are provided in regions overlapping the wide part 40w in plan view.

In this manner, the liquid crystal apparatus 300 that can satisfy the limitation of the layout with a good light-shielding property, and favorably electrically connect between the pixel electrode 10 and the transistor 1 can be provided.

The liquid crystal apparatus 300 of this embodiment further includes the interlayer insulating layer 76 as an insulating member provided between the transistor 1 and the capacitive electrode 40 as a relaying layer and including the recess 71a and the contact hole 71b at the bottom portion of the recess 71a, and the contact plug 74 as a connecting member provided in the recess 71a and the contact hole 71b to electrically connect the transistor 1 and the capacitive electrode 40.

In this manner, the liquid crystal apparatus 300 that can satisfy the limitation of the layout, achieve the desired TFT characteristics, and favorably electrically connect between the pixel electrode 10 and the transistor 1 can be provided.

Further, in the liquid crystal apparatus 300 of this embodiment, the contact plug 74 as a connecting member partially overlaps the contact plug 31 as a connecting member in plan view.

In this manner, the liquid crystal apparatus 300 that can satisfy the limitation of the layout, and favorably electrically connect between the pixel electrode 10 and the transistor 1 can be provided.

2. Embodiment 2

Figure 15:
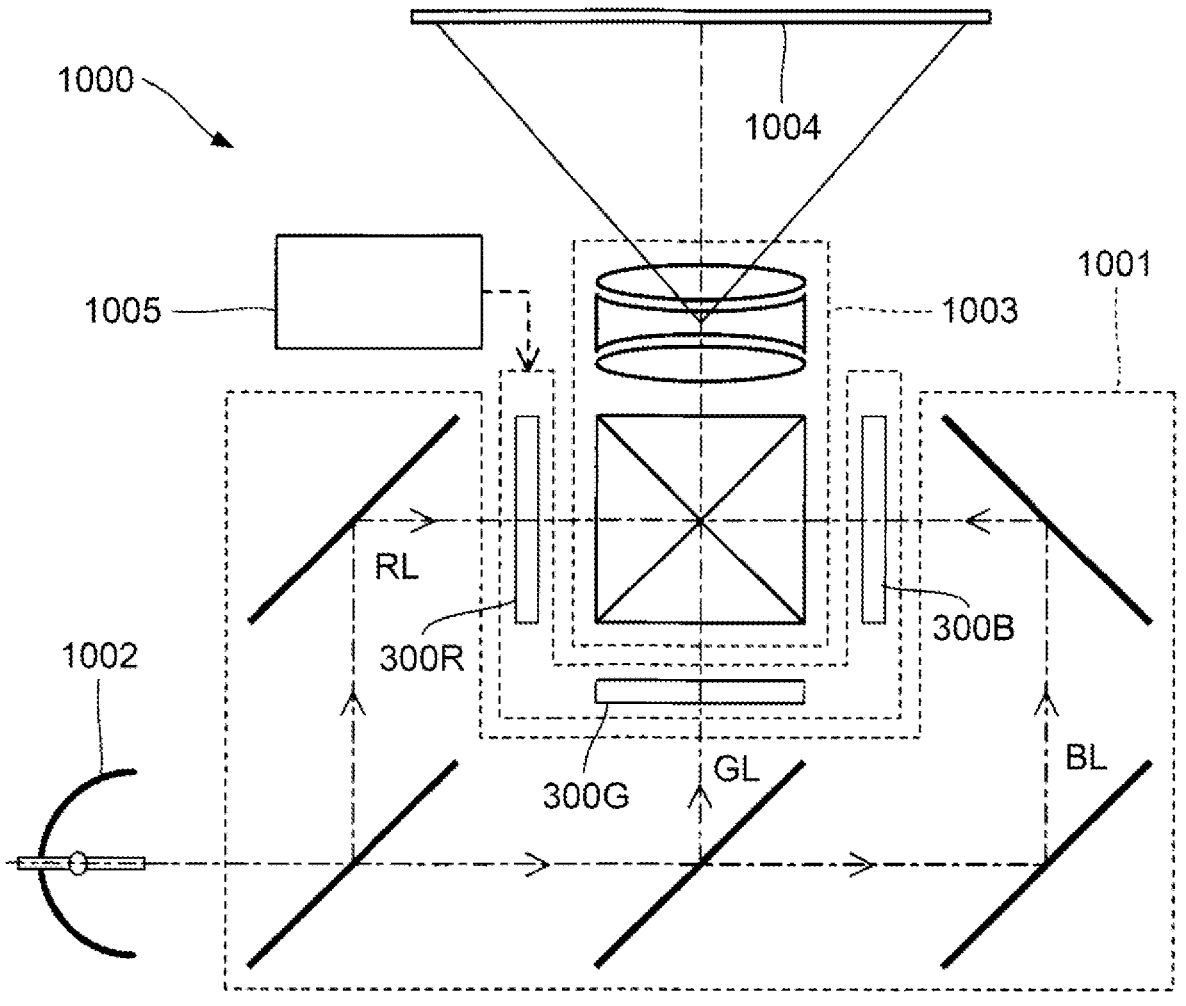
FIG. 15 is a schematic view illustrating an example of an electronic equipment according to an embodiment 2.

FIG. 15 is a schematic view illustrating a projector as a projection-type display device that is an example of an electronic equipment.

A projector 1000 is a three-plate type projector including three liquid crystal apparatuses 300 described above, for example. A liquid crystal apparatus 300R corresponds to the display color of red, a liquid crystal apparatus 300G corresponds to the display color of green, and a liquid crystal apparatus 300B corresponds to the display color of blue. A control unit 1005 includes a processor and a memory, and controls the operations of the liquid crystal apparatuses 300R, 300G and 300B, for example.

In light emitted from an illumination apparatus 1002 serving as a light source, an illumination optical system 1001 supplies a red component RL to the liquid crystal apparatus 300R, a green component GL to the liquid crystal apparatus 300G, and a blue component BL to the liquid crystal apparatus 300B. Each of the liquid crystal apparatuses 300R, 300G and 300B functions as a light modulation apparatus that modulates the color light RL, GL and BL supplied from the illumination optical system 1001 in accordance with the display image.

A projection optical system 1003 combines the light emitted from each of the liquid crystal apparatuses 300R, 300G and 300B and projects it to a projector screen 1004.

As described above, the projector 1000 as the electronic equipment of this embodiment includes the above-described liquid crystal apparatus 300.

In this manner, the performance of the projector 1000 can be improved by employing the liquid crystal apparatus 300 with high optical performance and electrical reliability.

Note that the electronic equipment is not limited to the projector 1000 of three-plate type exemplified above. For example, it may be a projector of single plate type, two-plate type, or of a type with four or more liquid crystal apparatuses 300. In addition, the electronic equipment may be a PDA (Personal Digital Assistants), a digital still camera, a television, a video camcorder, a car navigation system, an in-vehicle display, an electronic notebook, an electronic paper, a calculator, a word processor, a workstation, a television phone, and an apparatus including a POS (Point of sale), a printer, a scanner, a copier, a video player, or a touch panel, and the like.

Although preferred embodiment embodiments have been described above, the present disclosure is not limited to the above-described embodiments. In addition, the configuration of each component of the present disclosure can be replaced with any configuration with the same functions of the above embodiments, and any configuration can be added.

What is claimed is:

1. An electrooptic apparatus comprising:
   a transistor;
   a pixel electrode provided corresponding to the transistor;
   a first insulating member provided with a lens layer between the transistor and the pixel electrode, the first insulating member including a first recess and a first contact hole at a bottom portion of the first recess;
   a first connecting member provided in the first recess and the first contact hole, and configured to electrically connect the transistor and the pixel electrode; and
   a relaying layer configured to electrically connect the first connecting member and the transistor, the relaying layer including a wide part overlapping the transistor in plan view, a first protruding part protruding from the wide part along a first direction, and a second protruding part protruding from the wide part along a second direction intersecting the first direction, wherein
   the first connecting member is provided in a region overlapping the wide part of the relaying layer in plan view.

2. The electrooptic apparatus according to claim 1, further comprising:
   a second insulating member provided between the first insulating member and the pixel electrode, and including a second contact hole; and
   a second connecting member provided in the second contact hole, and configured to electrically connect the first connecting member and the pixel electrode, wherein
   the first contact hole and the second contact hole are provided so as not to overlap each other in plan view.

3. The electrooptic apparatus according to claim 2, wherein a width of an opening of the second contact hole on the first connecting member side is smaller than a width of an opening of the first contact hole on the second connecting member side.

4. The electrooptic apparatus according to claim 2, wherein the second connecting member includes a portion protruded from the first connecting member in plan view.

5. The electrooptic apparatus according to claim 1, wherein the first contact hole is provided so as not to overlap the pixel electrode in plan view.

6. The electrooptic apparatus according to claim 2, wherein the second connecting member is provided in a region overlapping the relaying layer in plan view.

7. The electrooptic apparatus according to claim 6, wherein the second connecting member is provided in a region overlapping the wide part in plan view.

8. The electrooptic apparatus according to claim 6, further comprising:

a third insulating member provided between the transistor and the relaying layer, and including a third contact hole at a second recess and a bottom portion of the second recess; and a third connecting member provided in the second recess and the third contact hole, and configured to electrically connect the transistor and the relaying layer.

9. The electrooptic apparatus according to claim 8, wherein the third connecting member partially overlaps the first connecting member in plan view.

10. An electronic equipment comprising the electrooptic apparatus according to claim 1.

* * * * *